May 7, 1957     E. H. MEIER     2,791,288
METHODS AND APPARATUS FOR PRESENTING SEISMIC INFORMATION
Filed Jan. 18, 1952     3 Sheets-Sheet 1

INVENTOR.
EDWIN H. MEIER
BY
Seymour M. Rosenberg
ATTORNEY.

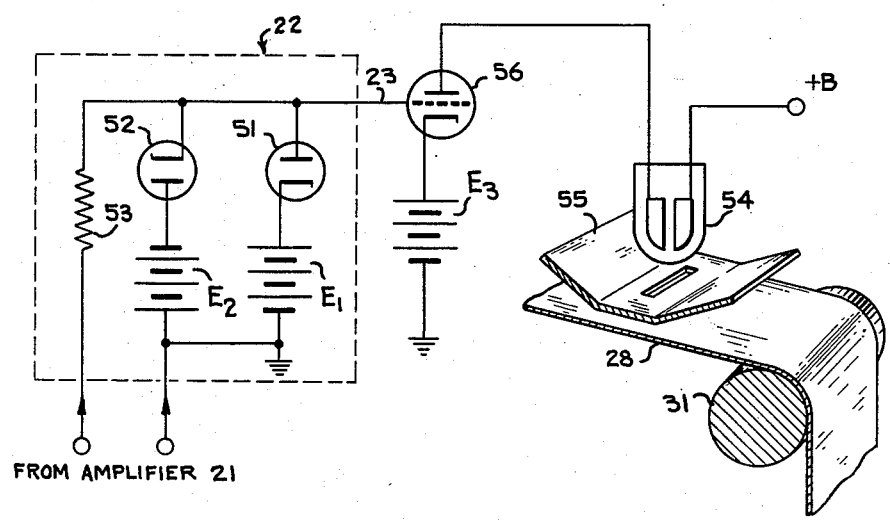
FIG-3
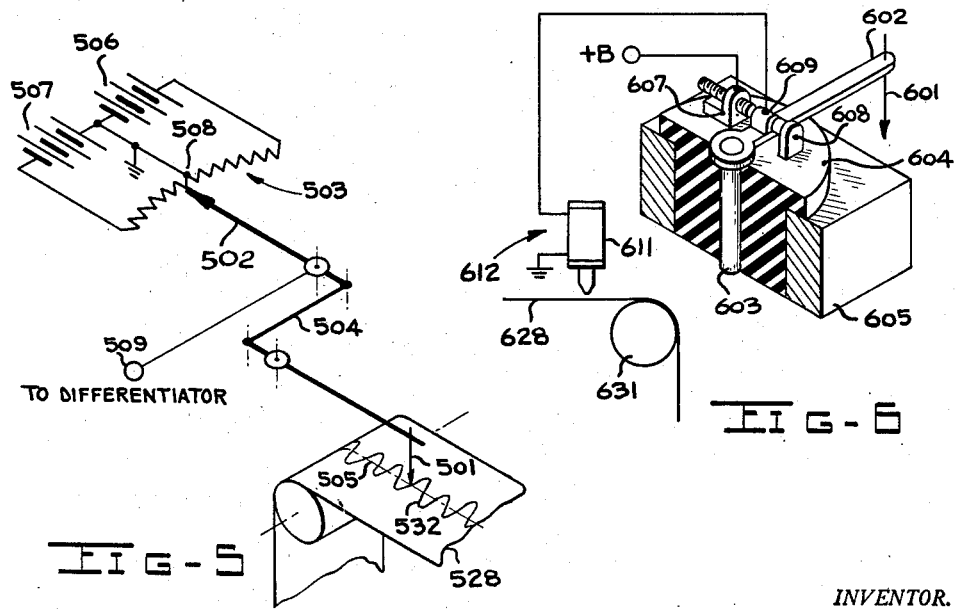
FIG-5
FIG-6
INVENTOR.
EDWIN H. MEIER
BY
Seymour M. Rosenberg
ATTORNEY May 7, 1957 E. H. MEIER 2,791,288
METHODS AND APPARATUS FOR PRESENTING SEISMIC INFORMATION
Filed Jan. 18, 1952 3 Sheets-Sheet 3
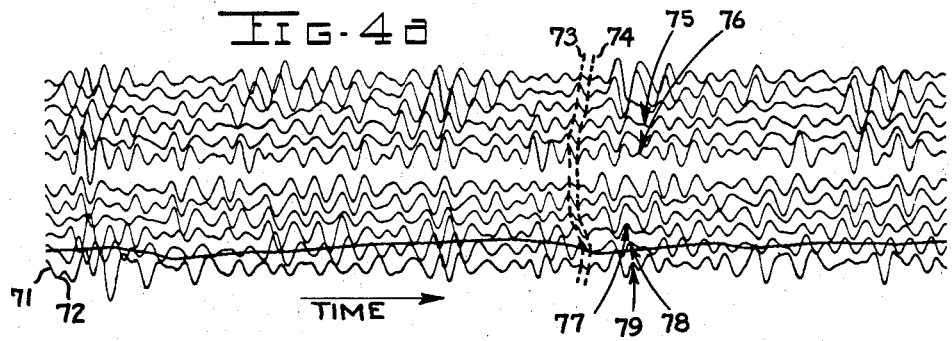
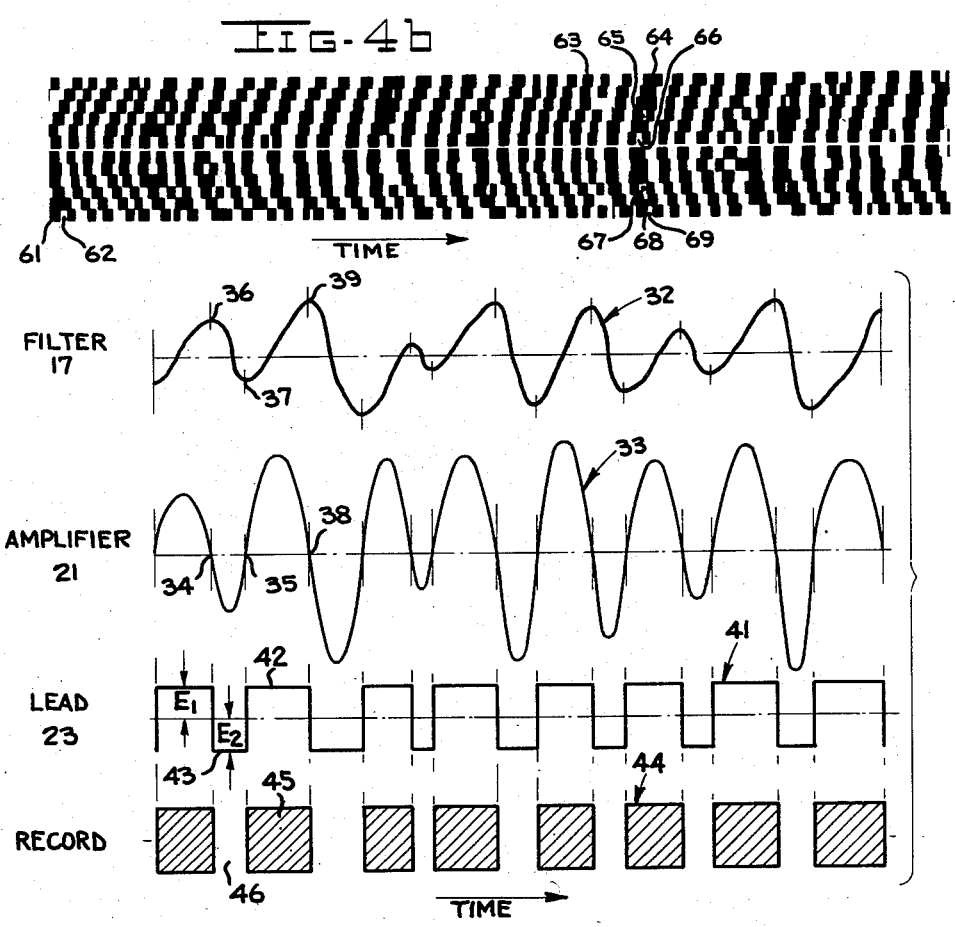
INVENTOR.
EDWIN H. MEIER
BY
Seymour M. Rosenberg
ATTORNEY.

United States Patent Office 2,791,288
Patented May 7, 1957

2,791,288

METHODS AND APPARATUS FOR PRESENTING SEISMIC INFORMATION

Edwin H. Meier, Los Angeles, Calif., assignor of ten percent to Seymour M. Rosenberg, Los Angeles, Calif.

Application January 18, 1952, Serial No. 267,109

15 Claims. (Cl. 181—.5)

The present invention relates to methods and apparatus for presenting seismic information and more particularly to methods and apparatus for presenting seismic information in the form of a duodensity record.

In the prior art, the general process of geophysical exploration for obtaining seismic information comprises initiating an impulse or localized disturbance at a point within the earth's crust and recording the resultant earth movement at a plurality of spaced points, each of the points being spaced from the "shot point," that is, the point of origin of the impulse. The original impulse generates an elastic wave which is transmitted through the earth as a damped wavetrain. Any discontinuity or variation of structure within the earth will produce a reflection or refraction of the damped wavetrain, which will be received at the plurality of spaced recording points. The seismic information desired is derived from the plurality of line-records or traces made of the wavetrains received at the plurality of recording points.

As is well-known in the art, the resulting records are difficult to interpret by reason of the fact that the wavetrains produced by reflections or refractions from various strata of the earth are modified by wavetrains of an indefinite nature which are received simultaneously at the recording points. These latter wavetrains may be produced in numerous ways, such as multiple reflections, and sustained vibrations of various strata. In addition, where several strata are relatively closely spaced and of different length, portions of the wavetrain resulting from one stratum will be modified by the wavetrain resulting from another stratum. This condition often results in additional amplitude reversals of the wavetrain and is known as "cycle-splitting." Accordingly, with the exception of records made in a few favorable regions, records produced in the manner described above are of such complex waveforms as to provide little seismic information by mere visual inspection.

Various methods have been proposed for converting the wavetrain traces into a form which provides readily ascertainable seismic information. According to one method, the instantaneous amplitudes of a series of corresponding wavetrain traces are added together, and the resulting single wavetrain is recorded. A summation method of this type is disclosed in U. S. Patent Serial No. 2,243,730 for "Apparatus for Analysis of Seismographic Records" by L. G. Ellis, dated May 27, 1941. This method has a number of disadvantages. Firstly, it requires that the original trace be in the form of a variable density track on photographic film. Secondly, a large amount of additional equipment is required to obtain the desired traces, and this equipment must be accurately and precisely adjusted. Thirdly, since each series of conventional wavetrain traces is converted into a single summation trace, much of the seismic information present in the series of traces, such as truncation of beds, relative slopes, etc., is lost.

The prior art has proposed numerous other methods based on accentuating the strongest reflections and eliminating all others. One such method is disclosed in U. S. Patent Serial No. 2,161,764 for "Method and Means for Recording Seismic Waves" by J. P. Minton, dated June 6, 1939, in which each received wave is successively altered until a single impulse remains. Obviously, the remaining single impulse may represent the reflection from an undesired stratum, and no valuable information may be produced by this method. At most, the method will indicate the position of a single stratum, and all other seismic information will be sacrificed.

The present invention discloses methods and apparatus for presenting seismic information which obviates the above and other disadvantages of the prior art. The basic principle of the invention, as distinguished from those of the prior art, is the production of a duodensity record for each wavetrain, that is a record having alternate areas of two distinct characteristics. The areas of one characteristic correspond to the time interval between each peak of the conventional wavetrain trace to the next succeeding valley, while the areas of the other characteristic correspond to the time interval between each valley and the next succeeding peak.

More specifically, if the record is in the form of photosensitive material, such as photographic film, the two distinct characteristics are abilities to transmit illumination. For example, one area may be opaque to the illumination, while the other area may be transparent to the illumination. If the recording medium is photographic paper, one area may be relatively dark while the other area may be relatively light. On the other hand, if the record is in the form of magnetizable material, such as magnetic tape, the two distinct characteristics are directions of magnetic polarization. For example, one area may be polarized in one direction, while the other area is polarized in the opposite direction. Because each wavetrain record of the present invention contains alternate areas of opposite characteristics, the term "checkered" or "duodensity" record is used.

The basic method for producing the records of this invention comprises modifying each conventional wavetrain to produce an electrical signal of alternate amplitude levels, and applying the electrical signal to the recording element to control the operation of the recording element. More particularly, where the records of the present invention are to be produced directly from field explorations, the output signal of each conventional sensing element is differentiated and amplified. The amplified signal is then clipped to produce an output signal having alternate levels, and this output signal controls the operation of the recording element.

Where the records of the present invention are to be produced from available conventional records, the first step, according to one modified method of the present invention, is to reproduce the conventional wavetrain signal in any conventional manner. The remaining steps are substantially the same as those outlined above. On the other hand, according to a modified method of the present invention, the conventional records may be converted directly into an electrical signal having the alternate amplitude levels.

With the records of the present invention, the record crossings, that is a group of aligned peaks corresponding to a reflecting stratum, are readily apparent and may be observed by a person unskilled in the art of analyzing seismic information. Thus, not only is the strongly reflecting layer recorded, but even relatively low level reflecting strata will be indicated by the records of this invention. Similarly, cycle splitting is made more apparent and may be resolved more easily than in conventional records. In this manner, many geological anomalies, which have heretofore been indiscernible in conventional records, may be recognized readily.

In addition, each record of the present invention will be of constant width, with the variation in characteristics being represented along the time axis of the record. Accordingly, the bottom trace of one record can be butted against the top trace of another record to obtain a continuous record of the complete section under exploration. Furthermore, each record may be readily shifted forward or backward relative to another record, in order to obtain various correction factors generally employed in the art.

It is to be noted that the operation of the present invention depends solely upon whether the amplified signal is of one polarity or another, and is substantially independent of the absolute magnitude of the amplified signal. Accordingly, the automatic gain control circuits, which form a large part of the amplifiers employed in conventional seismic recording apparatus, is eliminated.

It is, therefore, an object of the present invention to provide methods and apparatus for presenting seismic information in the form of a duodensity record.

Another object is to provide methods and apparatus for producing seismic wavetrain records having alternate areas of two distinct characteristics corresponding, respectively, to the peaks and valleys of conventional wavetrain traces.

A further object is to provide a method and apparatus for producing photographic seismic records having alternate areas of different light sensitive characteristics, corresponding, respectively, to the rises and falls of conventional wavetrain traces.

Still another object is to provide a method and apparatus for producing magnetic seismic records having alternate areas of opposite magnetic polarization corresponding, respectively, to the rises and falls of conventional wavetrain traces.

An additional object of this invention is to provide methods and apparatus for producing a seismic record which indicates the interval between each peak and the next succeeding valley and the interval between each valley and the next succeeding peak of the wavetrain.

A still further object is to provide methods and apparatus for converting conventional seismic wavetrain traces into duodensity records representing the rises and falls of the conventional wavetrain.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 2 is a composite diagram of the waveforms of signals occurring at various points in the circuit of Fig. 1, together with the record produced thereby;

Fig. 3 is a circuit diagram of one embodiment of the control circuit of Fig. 1, together with a photographic recording system;

Figs. 4a and 4b are illustrations of a conventional seismic record and the corresponding duodensity record;

Fig. 5 is a circuit diagram of a portion of one embodiment of a record converting system according to this invention; and Fig. 6 is a schematic diagram of another embodiment of a record converting system, together with a magnetic recording system.

Figure 1:
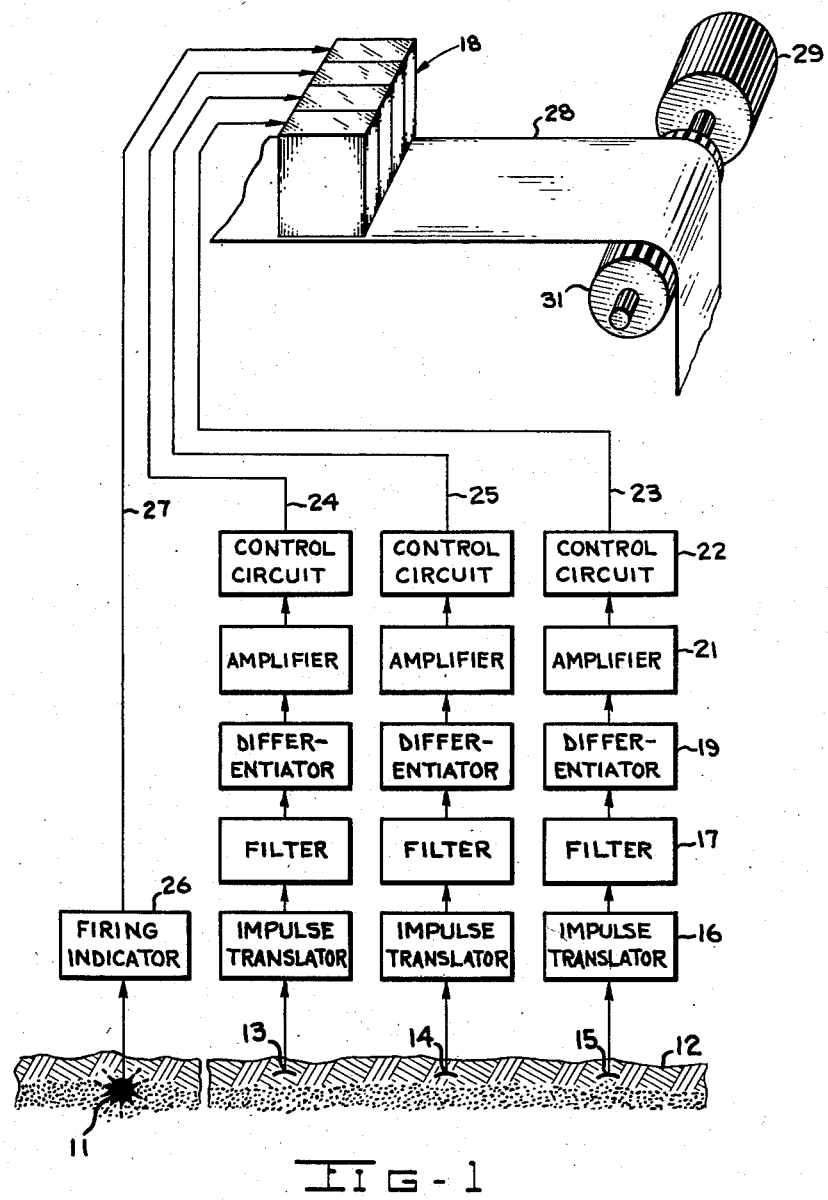
Fig. 1 is a schematic diagram of a system of geophysical exploration according to this invention.

Referring now to the drawings, there is shown in Fig. 1 a schematic diagram of a system of geophysical exploration according to this invention. A source 11 of elastic waves is imbedded beneath the surface 12 of the earth, source 11 being any conventional device for generating an impulse or localized disturbance, such as a charge of explosive. Positioned at spaced points adjacent surface 12 are a plurality of impulse receivers 13, 14, and 15 aligned with each other and with source 11. Each of receivers 13, 14, and 15 receives the elastic wave generated by source 11 after reflection from various strata within the surface of the earth. Although only three receivers are shown in Fig. 1, it is to be understood, of course, that any number of receivers may be used.

As in conventional systems, each receiver, such as receiver 15, is connected to a device, such as impulse translator 16, for translating the impulses received at the associated receiver into an electrical wavetrain signal. An example of an impulse translator of this type is the well-known geophone. The output signal of translator 16 is applied to an electrical filter 17 which eliminates the undesired frequencies of the received impulses. Similar filters, not designated, are connected to the impulse translators associated with receivers 13 and 14.

The components of the system thus far described are those utilized in conventional geophysical systems. In the prior art, it has been the practice to record either the electrical wavetrain signal appearing at the output end of each filter, or a specified portion of this conventional wavetrain signal. However, according to the present invention, the conventional wavetrain signal is not recorded, but, instead, the signal recorded corresponds to the peaks and valleys of the conventional wavetrain signal.

The remaining elements connected between the filters and a recording element, generally designated 18, constitute the means for producing the records according to this invention. Since the elements associated with each receiver and translator are identical, only those associated with receiver 15 and translator 16 will be described in detail.

The output end of filter 17 is connected to the input end of an electrical differentiator 19 which has its output terminal connected to the input terminal of an amplifier 21. Differentiator 19 may be of any conventional form, such as for example, those illustrated at page 599 of Radio Engineering, third edition, by Frederick E. Terman, published in 1947 by McGraw-Hill Book Company, Inc., New York, New York. The output terminal of amplifier 21 is connected to the input terminal of a recording control circuit 22 which is any suitable device for controlling the actuation of recording element 18. A conductor 23 interconnects control circuit 22 with that section of recording element 18 which records the impulses received at receiver 15. Similarly, conductors 24 and 25 interconnect the control circuits associated with receivers 13 and 14, respectively, with the associated sections of recording element 18. As in conventional practice, a firing indicator 26 has its input terminal connected to source 11 and its output terminal connected through a conductor 27 to that section of recording element 18 which indicates the time of occurrence of the impulse.

Recording element 18 is positioned in alignment with any suitable recording medium, such as a movable tape 28, each section of recording element 18 being arranged to record on a track or channel of tape 28, under the control of its associated control circuit. Tape 28 is uniformly driven at any desired uniform rate by means of a motor 29 and a roller 31 suitably coupled to motor 29. In this manner, longitudinal distances along tape 28 represent time intervals.

In operation, referring now to Fig. 2, the output signal 32 from filter 17 is of complex waveform having numerous peaks and valleys. Signal 32 is differentiated by means of differentiator 19, and the differentiated signal is amplified by amplifier 21 to produce a signal 33 at the output end of amplifier 21. It will be noted that each of the zero amplitude points, such as points 34 and 35 of signal 33 corresponds to a peak or a valley, such as peak 36 and valley 37, respectively, of signal 32. In other words, the portion of signal 33 between points 34 and 35 corresponds to the fall between peak 36 and valley 37 of signal 32. Similarly, the portion of signal 33 between point 35 and the next succeeding zero point 38 corresponds to the rise between valley 37 and the next succeeding peak 39 of signal 32. Accordingly, the time interval between each pair of zero amplitude points of signal 33 corresponds to either the rise time or the fall time of signal 32. Stated differently, the time interval between each pair of zero amplitude points of signal 33 corresponds to either the time interval between each peak and the next succeeding valley of signal 32, or the time interval between each valley and the next succeeding peak of signal 32.

It should be apparent, therefore, that, if the time intervals between the zero amplitude points of signal 33 were recorded in time sequence on tape 28, the times of occurrence of all of the peaks and valleys, and the duration of all of the rises and falls of signal 32, would be presented on tape 28. Accordingly, it is the function of control circuit 22 to control recording element 18 so that recording element 18 is actuated during the intervals between alternate pairs of zero amplitude points of signal 33. Thus, circuit 22 may be any suitable device for producing an output signal 41 having alternate levels of different amplitudes, one level, such as level 42 corresponding to the rise in signal 32, and the other level, such as level 43, corresponding to the fall in signal 32.

There are numerous well-known electronic clipping devices which will produce output signal 41 from signal 33. Several of such devices are described below, it being understood, of course, that the specific circuits disclosed are merely illustrative and not intended as a limitation upon the scope of the invention, as defined in the appended claims.

It should be noted that the alternate levels of signal 41, as shown in Fig. 2, are of opposite polarity, that is level 42 is positive while level 43 is negative. It is to be understood, however, that the two levels may be of the same polarity, or that one of the levels may be of zero amplitude, as explained more fully below. However, for the purposes of describing the operation of the system of Fig. 1, the levels shown in Fig. 2 have been selected.

If it is assumed that recording element 18 is actuated by a positive signal and unactuated by a negative signal, then the record produced on recording medium 28 is of the type shown in the last line of Fig. 2. As shown, record 44 comprises alternate areas of two distinct characteristics, one of the characteristics being indicated by the shaded area and the other characteristic being indicated by the blank area. The shaded areas, such as area 45, correspond to the rises in signal 32, such as the rise between valley 37 and peak 39, while the blank areas, such as area 46, correspond to the falls in signal 32, such as the fall between peak 36 and valley 37. In other words, the times of occurrence of each valley and the next succeeding peak are indicated by the beginning and end, respectively, of each shaded area, while the times of occurrence of each peak and the next succeeding valley are indicated by the beginning and end, respectively, of each blank area.

The record shown in Fig. 2 may be termed a "checkered" or "duodensity" record, since it contains alternate areas of opposite characteristics. In addition, each record is of constant width, as shown in Fig. 2, and is independent of the amplitudes of the individual peaks and valleys of signal 32. The variations represented by the records of the present invention are the time durations of the rises and falls of signal 32, or the times of occurrence of each peak and each valley of signal 32. Since the record produced by the present invention is substantially independent of the absolute magnitude of the peaks and valleys of signal 32, it is unnecessary to provide the complex automatic gain control circuits generally employed in conventional geophysical exploration systems.

Referring now to Fig. 3, there is shown one form of control circuit 22 of Fig. 1, together with the associated section of recording element 18 of the photographic type. As shown, circuit 22 comprises a conventional diode clipper including diodes 51 and 52. Diode 51 has its anode connected to one end of a load resistor 53 and its cathode connected to the positive terminal of a source of direct-current potential, such as a battery $E_1$. Diode 52 has its cathode connected to the anode of diode 51 and its anode connected to the negative terminal of another source of direct-current potential, such as a battery $E_2$. The positive terminal of battery $E_2$ and the negative terminal of battery $E_1$ are grounded, while the free end of resistor 53 is connected to the output terminal of amplifier 21.

Diode 51 serves to clip the positive peaks of signal 33 so that the positive level of signal 41 is substantially equal to the voltage of battery $E_1$. Similarly, diode 52 serves to clip the negative peaks of signal 33 so that the negative level of signal 41 is substantially equal to the voltage of battery $E_2$. Accordingly, the signal appearing on output conductor 23 is signal 41 of Fig. 2.

As stated above, conductor 23 is connected to the section of recording element 18 associated with receiver 15 and filter 17. Although recording medium 28 and recording element 18 may take any suitable form, in Fig. 3 it is assumed that medium 28 is a photographic medium, and that recording element 18 includes a gas discharge tube 54 and an optical slit 55 for concentrating the illumination from tube 54 on the track or channel of medium 28 corresponding to receiver 15. One terminal of tube 54 is connected to the +B terminal of a source of direct-current potential, not shown, the other terminal of this source being grounded. Tube 54 has its other terminal connected to the anode of a vacuum tube, such as a triode 56. The grid of triode 56 is connected to conductor 23, while the cathode of triode 56 is connected to the positive terminal of a source of direct-current potential, such as a battery $E_3$. The negative terminal of battery $E_3$ is grounded.

In operation, the potential from battery $E_3$ is sufficient to bias triode 56 just beyond cutoff, and thereby to prevent conduction through gas discharge tube 54. When signal 41 is applied to triode 56, the negative levels drive the grid of triode 56 further negative and are ineffective to energize tube 54. On the other hand, the positive levels of signal 41 drive the grid of triode 56 above cutoff, and cause triode 56 to conduct and energize tube 54. In this manner, medium 28 will be illuminated only during the intervals of the positive levels of signal 41. Accordingly, record 44 of Fig. 2 represents the pattern produced on medium 28 wherein the two distinct characteristics are light and dark areas, respectively.

Although a particular clipping circuit has been illustrated in Fig. 3, it is to be understood, of course, that this circuit is merely illustrative and is not intended as a limitation on the scope of the invention. For example, if it is desired to produce only a positive level, such as level 42, and a zero level instead of level 43, battery $E_2$ may be replaced with a conductor. On the other hand, since tube 54 operates with a potential difference of either polarity across its terminals, tube 54 may be arranged to be actuated by the negative levels of signal 41. For example, in Fig. 3, battery $E_1$ may be replaced with a conductor and tube 54 may be connected directly between conductor 23 and ground. In this manner, only the negative levels, such as level 43, will be produced at conductor 23, and tube 54 will be energized by these levels. In addition, various other forms of clipping circuits may be used, such as for example, those described on pages 597 through 599 of the above-cited Radio Engineering text.

It should be noted that the recording element of the photographic type illustrated in Fig. 3 includes a single gas discharge tube for each trace of the duodensity record of the present invention. On the other hand, conventional systems require a galvanometer movement for recording each wavetrain signal. Accordingly, in addition to the other advantages pointed out above, the present invention has the advantage of a less costly and less complicated recording element.

Referring now to Figs. 4a and 4b, there are shown composite diagrams, respectively, of a plurality of conventional seismic traces and the corresponding duodensity traces of this invention. In Fig. 4a, each horizontal trace represents the variation in amplitude with respect to time of the signal received at its associated receiver. In Fig. 4b, each horizontal trace represents the time durations of the rises and falls of the corresponding conventional trace, the dark areas representing falls and the light areas representing rises. For example, dark area 61 of the bottom trace of Fig. 4b corresponds to fall 71 of the bottom trace of Fig. 4a, while light area 62 corresponds to rise 72. From Fig. 4a, the extreme difficulty in interpreting conventional seismic wavetrain records becomes readily apparent. In several instances, the traces are overlapping, and the extremes of the traces are not distinguishable. In other instances the traces are of such low amplitude that it is virtually impossible to determine where a peak or a valley begins. As a result, even those skilled in the reading of seismic records require a great deal of time and effort to obtain only a minimum of information from these traces.

The duodensity record of the present invention, as shown in Fig. 4b, presents the seismic information to the observer in a clear and unambiguous manner. Thus, record crossings are presented in Fig. 4b as the leading or trailing edges of either the dark areas or the light areas of the traces, regardless of the relative amplitude of the signal. For example, dashed line 73 of Fig. 4a represents a phase line-up of peaks of the conventional traces, while dashed line 74 represents a phase line-up of valleys, each corresponding to a record crossing. On the other hand, in Fig. 4b, these line-ups are represented by the leading and trailing edges, respectively, of aligned dark areas 63. It is obvious that the duodensity record presents such information in a simple and readily recognizable form, as compared with the conventional traces.

Similarly, cycle splitting further complicates the conventional record, and makes it extremely difficult to accurately analyze the section of the earth being explored. Such cycle-splitting may be seen at points 75 through 79 in Fig. 4a. In this case, it requires a careful analysis by an expert to determine which peaks are a part of the record crossing and which peaks belong to an additional stratum.

In Fig. 4b, on the other hand, the record crossing corresponding to these points is readily apparent as the leading edges of aligned dark areas 64. Cycle-splitting points 75 and 76 are readily apparent in Fig. 4b as blank areas 65 and 66, respectively. Similarly, points 77 through 79 of Fig. 4a are represented, respectively, by blank areas 67 through 69 of Fig. 4b. Accordingly, even an unskilled observer can readily detect the desired seismic information from the records of the present invention.

The invention has been described thus far in connection with a system for producing duodensity records directly in the field. In some instances, it may be desirable to take available seismic records, which were produced in any conventional manner, and convert these records into duodensity form. Portions of two converting systems for accomplishing this result are shown in Figs. 5 and 6, respectively.

In Fig. 5, there is shown the input apparatus for one form of record converting system according to this invention. A stylus 501 is positioned over a recording medium 528 having a conventional seismic wavetrain record 532 recorded thereon. Stylus 501 is arranged to follow record 532 either manually or automatically. The movable arm 502 of a potentiometer, generally designated 503, is mechanically coupled through any suitable linkage, designated by line 504, to stylus 501 for movement therewith. Stylus 501 and arm 502 are so arranged that when stylus 501 is on the base or zero amplitude line 505 of record 532, arm 502 is at the midpoint of potentiometer 503.

Potentiometer 503 has one of its ends connected to the positive terminal of a source of direct-current potential, such as a battery 506 and the other of its ends connected to the negative terminal of another source of direct-current potential, such as a battery 507. The negative terminal of battery 506 and the positive terminal of battery 507 are connected together and to ground. Potentiometer 503 has its center tap 508 grounded, while arm 502 is connected to an output terminal 509 which, in turn, is connected to the input terminal of differentiator 19 of Fig. 1.

In operation, so long as stylus 501 is aligned with base line 505 of record 532, arm 502 will be in contact with grounded center tap 508, and no signal will appear at terminal 509. As stylus 501 moves above base line 505 to follow the path of record 532, arm 502 also will be moved above center tap 508 and a positive voltage will be produced at terminal 509. On the other hand, as arm 502 moves below center tap 508 in accordance with the movements of stylus 501 below base line 505, a negative voltage will be produced at terminal 509. In each instance, the voltage produced at terminal 509 is directly proportional to the amplitude of record 532. Accordingly, the varying voltage signal appearing at terminal 509 will be the electrical equivalent of record 32. By applying this signal to differentiator 19 and to a control circuit, as in Fig. 1, the duodensity record of the present invention will be produced.

Although the record converting system of Fig. 5 employs a differentiator and a control circuit for generating the control signal, it should be clear that this type of signal can be produced directly. In addition, although a photographic recording medium has been described in connection with Fig. 3, it is apparent that other types of recording mediums may be utilized. In Fig. 6, there is illustrated a direct type of converting system together with a magnetic recording medium.

Referring now to Fig. 6, a stylus 601 is mechanically coupled to an arm 602 which is mounted on a pivot pin 603 for rotational movement therewith. Pin 603 is frictionally mounted within a bushing 604 which, in turn, is frictionally mounted on a support 605. Stationarily supported on bushing 604 on one side of arm 602 is an electrical contact 607 which is connected to the +B terminal of a source of direct-current potential, not shown, the other terminal of the source being grounded. A stationary stop 608 is mounted on bushing 604 on the opposite side of arm 602 and in alignment with contact 607. An electrical contact 609 is mounted on arm 602 in alignment with contact 607 and stop 608, contact 609 being connected to one end of the coil 611 of an electromagnet, generally designated 612. The other end of coil 611 is grounded. Electromagnet 612 is positioned above and in alignment with a magnetic recording medium, such as a magnetic tape 628, driven by drive roller 631.

In operation, contacts 607 and 609 and stop 608 are so adjusted that, with stylus 601 on the base line of the record, contacts 609 and stop 608 are engaged, and contact 609 is just out of engagement with contact 607. Under these conditions, electromagnet 611 will not be energized, and no recording will be made on tape 628. As stylus 601 moves upwardly to trace the rises in the record, arm 602 and pin 603 will rotate slightly counterclockwise about the axis of bushing 604 which will not rotate owing to the greater friction between bushing 604 and support 605. After a slight rotation of arm 602, contact 609 will engage contact 607 and energize electromagnet 611. Any further movement of arm 602, due to further upward movement of stylus 601, will move pin 603 and bushing 604 in unison and engagement between contacts 607 and 609 will be maintained.

When stylus 601 moves downwardly to trace the first fall, arm 602 and pin 603 will rotate slightly clockwise about the axis of bushing 604 thereby disengaging contact 609 from contact 607 and engaging it with stop 608. Any further clockwise movement of arm 602 will also rotate bushing 604 about support 605. Upon the next upward movement of stylus 601, contacts 607 and 609 will again engage, and the cycle of operation will be repeated.

It is thus seen that the voltage at contact 609, and therefore the voltage across electromagnet 611, will be similar to signal 41 of Fig. 2, except that the lower amplitude level will be zero. In other words, the time duration of each positive level of the signal appearing at contact 609 corresponds to each rise time of the conventional seismic record. Accordingly, the record produced by electromagnet 611 on tape 628 will be identical with record 44 of Fig. 2, where the shaded areas represent magnetized areas of one direction. The blank areas may represent either unmagnetized areas, or areas of magnetic polarization opposite to that of the shaded areas, depending upon the type of magnetic tape used.

It should be apparent that the duration of each fall of the conventional record, rather than each rise, could be recorded on tape 628 merely by connecting the +B terminal to stop 608, rather than contact 607. On the other hand, if both rises and falls were to be recorded as distinct types of magnetic polarization on an initially unmagnetized tape, a source of negative direct-current potential could be connected to stop 608, in addition to the source connected to contact 607.

What is claimed as new is:

1. In the process of geophysical exploration which includes producing at a plurality of spaced points a plurality of electrical wavetrain signals, respectively, representing the vibrations resulting from a created localized disturbance within the earth, the method of presenting the seismic information represented by the electrical wavetrain signals, said method comprising the steps of generating a corresponding plurality of squarewave electrical output signals, each having alternate voltage levels corresponding to the times of occurrence peaks and valleys, respectively, of the corresponding wavetrain signal, and simultaneously recording said plurality of electrical output signals.

2. In the process of geophysical exploration in which are produced a plurality of electrical wavetrain signals representing the earth movement received at a plurality of spaced points, respectively, as a result of an impulse initiated in the earth, the method of presenting the seismic information represented by the electrical wavetrain signals, said method comprising the steps of generating a corresponding plurality of squarewave electrical output signals, each having alternate levels of opposite polarities corresponding to the rises and falls, respectively, of the associated wavetrain signal, and simultaneously recording said plurality of electrical output signals.

3. The method of recording on a recording medium the seismic information represented by an electrical wavetrain signal in the form of first and second distinct characteristics of the medium, said method comprising the steps of generating an electrical output signal having alternate amplitude levels corresponding to the rises and falls, respectively, of the wavetrain, and recording in time sequence on the medium the duration of each of said levels corresponding to a rise as said first distinct characteristic, and the duration of each of said levels corresponding to a fall as said second distinct characteristic.

4. The method defined in claim 3, wherein the recording medium is a photosensitive medium and said distinct characteristics are opaqueness and transparency to illumination, respectively.

5. The method defined in claim 3, wherein the recording medium is a magnetic medium, and said distinct characteristics are opposite directions, respectively, of magnetic polarization.

6. In the process of geophysical exploration in which is produced an electrical wavetrain signal representing the vibrations resulting from a localized disturbance in the earth, the method of presenting the seismic information represented by the electrical wavetrain signal in duodensity form, said method comprising the steps of differentiating the wavetrain signal, amplifying the differentiated signal, limiting the amplified signal to produce a squarewave electrical output signals having alternate amplitude levels, and recording in time sequence the duration of each of the amplitude levels of said electrical output signal.

7. The method of recording in duodensity form an electrical wavetrain signal representing the vibration resulting from a localized disturbance in the earth, said method comprising the steps of differentiating the wavetrain signal, altering the differentiated signal to produce a squarewave electrical output signal having alternate amplitude levels corresponding to the rises and falls, respectively, of the wavetrain signal, and recording in time sequence the duration of each of the amplitude levels of said electrical output signal.

8. The method of converting a conventional seismic wavetrain record into a duodensity record, said method comprising the steps of generating a squarewave electrical output signal having alternate amplitude levels corresponding to the rises and falls, respectively, of the conventional wavetrain, and recording in time sequence the duration of each of said levels.

9. The method of geophysical exploration comprising the steps of creating a localized disturbance in the earth, translating the vibrations resulting from the disturbance into a plurality of electrical wavetrain signals at a plurality of points, respectively, spaced at different distances from the disturbance, and recording in time sequence as first and second distinct invariable characteristics the durations of the rises and falls, respectively, of each of said electrical wavetrain signals.

10. In combination with means for translating earth vibrations into an electrical wavetrain signal, having alternate rises and falls, means for producing a duodensity record, the two record characteristics corresponding in time sequence to the durations of the rises and falls, respectively, of said electrical wavetrain signal.

11. In a system of geophysical exploration, the combination comprising: first means for translating earth vibrations into an electrical wavetrain signal, having alternate rises and falls; second means electrically coupled to said first means for producing a squarewave electrical output signal having alternate first and second amplitude levels, the time durations of said first amplitude levels corresponding to the time durations of the rises, respectively, of the wavetrain signal, and the time durations of said second amplitude levels corresponding to the time durations of the falls, respectively, of the wavetrain signal; and third means electrically coupled to said second means for recording in time sequence as distinct invariable characteristics the durations of the first and second amplitude levels of said electrical output signal.

12. In combination with means for translating earth vibrations into an electrical wavetrain signal having alternate peaks and valleys, means for recording in time sequence the time intervals between each of said peaks and the next succeeding valley and between each of said valleys and the next succeeding peak as first and second distinct invariable characteristics, respectively.

13. In a system of geophysical exploration, the combination comprising: means for translating earth vibrations received at a plurality of spaced points into a plurality of electrical signals, respectively, each of said electrical signals having alternate rises and falls; means for recording in time sequence the durations of the rises and falls of each of said electrical signals as first and second distinct invariable characteristics, respectively.

14. Apparatus for recording an electrical wavetrain signal representing the vibrations resulting from a localized disturbance in the earth, the signal having alternate rises and falls, said apparatus comprising means for generating a squarewave electrical signal having alternate amplitude levels corresponding to the rises and falls, respectively, of the electrical wavetrain signal, and means for recording in time sequence the duration of each of the amplitude levels of the generated electrical signal.

15. Apparatus for converting a seismic wavetrain record having alternate rises and falls into a duodensity record, said apparatus comprising means for generating a squarewave electrical signal having alternate amplitude levels corresponding to the rises and falls, respectively, of the wavetrain record, and means for recording in time sequence the duration of each of said levels.

References Cited in the file of this patent
UNITED STATES PATENTS

| | | | |
|---|---|---|---|
| 2,051,153 | Rieber | Aug. 18, | 1936 |
| 2,161,764 | Minton | June 6, | 1939 |
| 2,364,209 | Green | Dec. 5, | 1944 |
| 2,377,903 | Rieber | June 12, | 1945 |
| 2,378,925 | Hoskins et al. | June 26, | 1945 |
| 2,395,289 | Neufeld | Feb. 19, | 1946 |
| 2,419,548 | Grieg | Apr. 29, | 1947 |
| 2,427,421 | Rieber | Sept. 16, | 1947 |
| 2,440,971 | Palmer | May 8, | 1948 |
| 2,539,220 | Athy et al. | Jan. 23, | 1951 |
| 2,555,806 | Mitchell | June 5, | 1951 |
| 2,557,714 | Williams | June 19, | 1951 |
| 2,558,868 | McCarty | July 3, | 1951 |